(12) United States Patent
Wu et al.

(10) Patent No.: US 9,836,138 B2
(45) Date of Patent: Dec. 5, 2017

(54) TOUCH PEN

(71) Applicant: Primax Electronics Ltd., Neihu, Taipei (TW)

(72) Inventors: Tung-Heng Wu, Taipei (TW); Ying-Che Tseng, Taipei (TW); A-Ming Chang, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 14 days.

(21) Appl. No.: 15/077,812

(22) Filed: Mar. 22, 2016

(65) Prior Publication Data

US 2017/0228051 A1    Aug. 10, 2017

(30) Foreign Application Priority Data

Feb. 5, 2016   (TW) .............................. 105104080 A (51) Int. Cl.
    *G06F 3/0354*   (2013.01)
    *G06F 3/044*    (2006.01)

(52) U.S. Cl.
    CPC ...... *G06F 3/03545* (2013.01); *G06F 3/03542* (2013.01); *G06F 3/044* (2013.01)

(58) Field of Classification Search
    CPC ... G06F 3/03545; G06F 3/03542; G06F 3/044
    USPC ............................... 345/179; 78/19.01–19.07
    See application file for complete search history.

(56) References Cited

U.S. PATENT DOCUMENTS

| | | | | |
|---|---|---|---|---|
| 9,310,900 B1* | 4/2016 | Kumar | ................ | G06F 3/03545 |
| 2005/0248549 A1* | 11/2005 | Dietz | ..................... | G06F 3/016 345/179 |
| 2011/0304577 A1* | 12/2011 | Brown | ................ | G06F 3/03545 345/174 |
| 2015/0029161 A1* | 1/2015 | Koo | ........................ | B43K 29/02 345/179 |
| 2015/0286311 A1* | 10/2015 | Chang | ..................... | G06F 3/044 345/174 |
| 2015/0363012 A1* | 12/2015 | Sundara-Rajan | ....... | G06F 3/038 345/179 |

* cited by examiner

*Primary Examiner* — Stephen Sherman
(74) *Attorney, Agent, or Firm* — Evan R. Witt; Kirton McConkie (57) ABSTRACT

A touch pen includes a main body, a connector, a first conductive pen tip, a second conductive pen tip and a switching module. The connector is disposed within the main body, and located at a first end of the main body. The first conductive pen tip and the second conductive pen tip are detachably coupled with the connector. According to a result of judging whether the connector is coupled with the first conductive pen tip or the second conductive pen tip, the switching module controls the operation mode of the touch pen. When the first conductive pen tip is coupled with the connector, the touch pen is in an active operation mode under control of the switching module. When the second conductive pen tip is coupled with the connector, the touch pen is in a passive operation mode under control of the switching module.

10 Claims, 4 Drawing Sheets

TOUCH PEN

FIELD OF THE INVENTION

The present invention relates to a touch pen, and more particularly to a touch pen for a capacitive touch device.

BACKGROUND OF THE INVENTION

The widely-used peripheral input device of a computer system comprises for example a mouse device, a keyboard device, a trackball device, or the like. With the progress of the times, a touch device is introduced into the market. By directly using the user's fingers or using a touch pen to operate the touch device, the touch device can be correspondingly controlled.

A capacitive touch device is one of the commercially available touch devices. When the user's finger touches the capacitive touch device, the capacitance value of the touch point of the capacitive touch device is subjected to a change. According to the change of the capacitance value, the position of the touch point is recognized. Among various touch devices, the capacitive touch device is widely adopted by most users because the capacitive touch device has enhanced touch accuracy and reduced fabricating cost.

Figure 1:
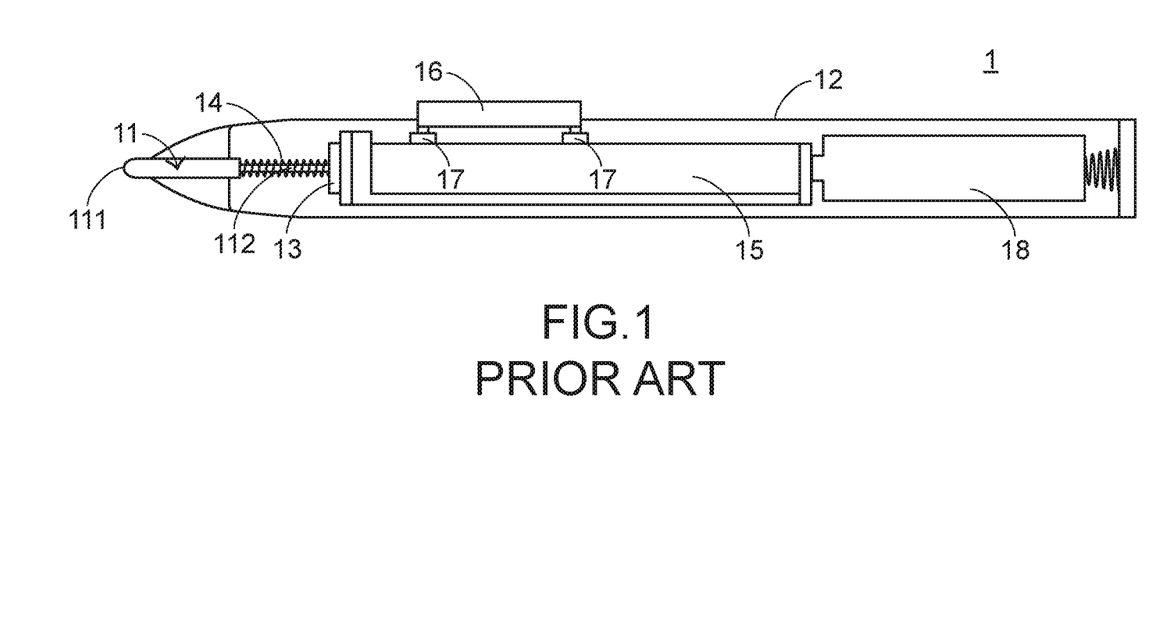
FIG. 1 is a schematic cross-sectional view of a conventional touch pen.

With increasing development of the capacitive touch device, a capacitive touch pen for the capacitive touch device has been introduced into the market. FIG. 1 is a schematic cross-sectional view of a conventional touch pen. As shown in FIG. 1, the conventional touch pen 1 comprises a conductive pen tip 11, a metallic main body 12, a pressure sensor 13, a spiral spring 14, a circuit board 15, an actuating button 16, two triggering switches 17 and a battery 18. The conductive pen tip 11 is located at an end of the metallic main body 12 and partially exposed outside the metallic main body 12. A first end 111 of the conductive pen tip 11 may be contacted with a capacitive touch device (not shown). A second end 112 of the conductive pen tip 11 is contacted with the pressure sensor 13. The spiral spring 14 is sheathed around the second end 112 of the conductive pen tip 11 and contacted with the pressure sensor 13. In case that the pressure sensor 13 is pushed by the second end 112 of the conductive pen tip 11, the pressure sensor 13 generates a touch signal. The circuit board 15 is disposed within the metallic main body 12. The pressure sensor 13 and the two triggering switches 17 are connected with the circuit board 15. The actuating button 16 is disposed on the metallic main body 12 and partially exposed outside the metallic main body 12. The actuating button 16 is contacted with the two triggering switches 17. The battery 18 is electrically connected with the circuit board 15 for providing electric power to the circuit board 15.

When the actuating button 16 is pressed by the user, the two triggering switches 17 are pushed by the actuating button 16. Consequently, the two triggering switches 17 generate an on signal to the circuit board 15 in order to activate the touch pen 1. After the touch pen 1 is activated, the user may grasp the touch pen 1 and allow the first end 111 of the conductive pen tip 11 to be contacted with the capacitive touch device. Consequently, the conductive pen tip 11 is moved relative to the metallic main body 12 in the direction toward the pressure sensor 13, and the spiral spring 14 is compressed to accumulate an elastic force. On the other hand, the pressure sensor 13 is pushed by the second end 112 of the conductive pen tip 11. Consequently, the pressure sensor 13 generates the touch signal and transmits the touch signal to the conductive pen tip 11. Under this circumstance, the capacitance value of the touch point between the capacitive touch device and the conductive pen tip 11 is changed. According to the change of the capacitance value, the capacitive touch device may recognize the position of the touch point and generate a corresponding command.

When the touch pen 1 is moved away from the capacitive touch device, the first end 111 of the conductive pen tip 11 is no longer contacted with the capacitive touch device. Under this circumstance, the compressed spiral spring 14 releases the elastic force so as to push the conductive pen tip 11. Consequently, the conductive pen tip 11 is moved relative to the metallic main body 12 in the direction away from the pressure sensor 13, and the conductive pen tip 11 is returned to the original position.

The pressure sensor 13 can detect the pressing force applied by the user and generate different touch signals according to different intensities of the pressing force. According to different touch signals, the conventional touch pen 1 can generate different effects. For example, if a normal pressing force is applied by the user, a line with a normal thickness may be drawn by the conventional touch pen 1. Whereas, if a stronger pressing force is applied by the user, a thicker line may be drawn by the conventional touch pen 1.

The conventional touch pen 1 is an active touch pen. The area of the conductive pen tip is smaller, and the active touch pen has higher sensitivity. Consequently, the active touch pen is suitably used for performing a more delicate operation such as a handwriting operation or a drawing operation. However, the power consumption of the active touch pen is high. Moreover, a passive touch pen is also introduced into the market. The area of the conductive pen tip of the passive touch pen is larger. The passive touch pen has lower sensitivity, and thus the passive touch pen is suitably used for performing a simple operation. Generally, the power consumption of the passive touch pen is lower.

The user can select the active touch pen or the passive touch pen according to the practical requirements. However, the user has to carry the active touch pen and the passive touch pen simultaneously. When needed, the suitable touch pen is selected. In other words, the conventional touch pen is neither convenient nor user-friendly.

Therefore, there is a need of providing a mode-adjustable touch pen.

SUMMARY OF THE INVENTION

An object of the present invention provides a mode-adjustable touch pen.

In accordance with an aspect of the present invention, there is provided a touch pen for a touch device. The touch pen includes a main body, a connector, a first conductive pen tip, a second conductive pen tip and a switching module. The connector is disposed within the main body, and located at a first end of the main body. The first conductive pen tip is detachably coupled with the connector, and contactable with the touch device. The second conductive pen tip is detachably coupled with the connector, and contactable with the touch device. The switching module is disposed within the main body, and contacted with the first conductive pen tip or the second conductive pen tip. The switching module detects whether the first conductive pen tip or the second conductive pen tip is coupled with the connector. When the first conductive pen tip is coupled with the connector, the touch pen is in an active operation mode under control of the switching module. When the second conductive pen tip is coupled with the connector, the touch pen is in a passive operation mode under control of the switching module.

In an embodiment, the switching module includes a circuit board, a push element, a detecting assembly and a controlling unit. The push element is disposed within the main body, and contacted with the first conductive pen tip or the second conductive pen tip. When the push element is pushed by the first conductive pen tip or the second conductive pen tip, the push element is moved relative to the main body. The detecting assembly is disposed on the circuit board to detect the push element. When the push element is detected by the detecting assembly, the detecting assembly issues an active mode signal. The controlling unit is disposed on the circuit board, and connected with the detecting assembly. When the active mode signal is received by the controlling unit, the touch pen is in the active operation mode under control of the controlling unit. When the active mode signal is not received by the controlling unit, the touch pen is in the passive operation mode under control of the controlling unit.

From the above descriptions, the present invention provides the touch pen. The touch pen can be selectively in the active operation mode or the passive operation mode. Moreover, by changing the conductive pen tip, the operation mode of the touch pen can be switched. Consequently, the touch pen is operated in a desired operation mode according to the practical requirements. In case that the longer conductive pen tip (e.g., the first conductive pen tip) is coupled with the connector, the push element is pushed by the first conductive pen tip and thus the push element is detected by the detecting module. Consequently, the touch pen is in the active operation mode under control of the controlling unit. In case that the shorter conductive pen tip (e.g., the second conductive pen tip) is coupled with the connector, the push element is not pushed by the first conductive pen tip and thus the push element is not detected by the detecting module. Consequently, the touch pen is in the passive operation mode under control of the controlling unit. As previously described, the user has to carry two kinds of touch pens according to the conventional technology. The use of the touch pen of the present invention can overcome the drawbacks of the conventional technology.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For solving the drawbacks of the conventional technology, the present invention provides a touch pen.

Figure 2:
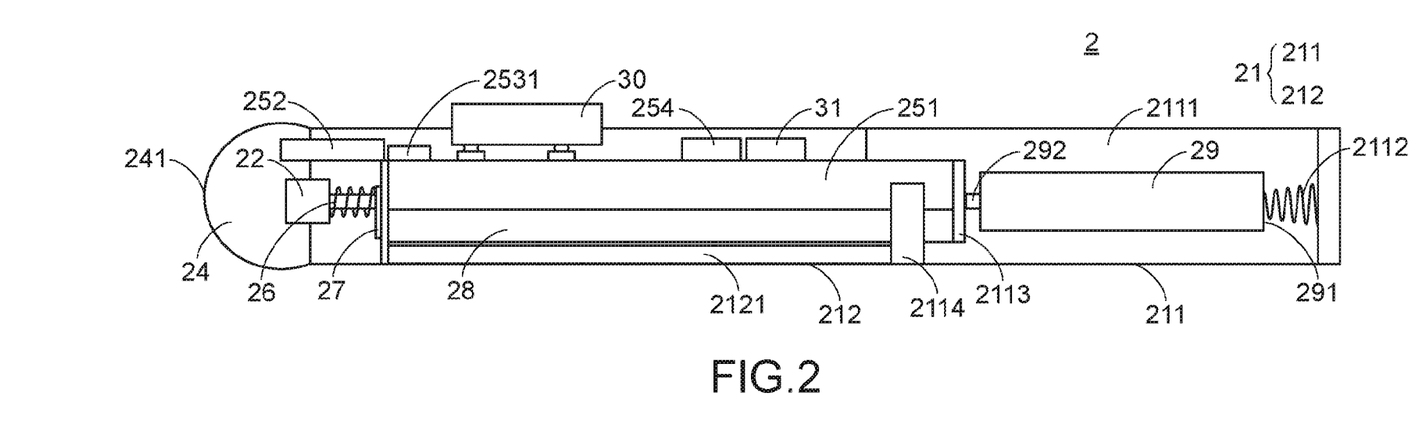
FIG. 2 is a schematic cross-sectional view illustrating a touch pen according to a first embodiment of the present invention, in which the touch pen is in a passive operation mode.
Figure 3:
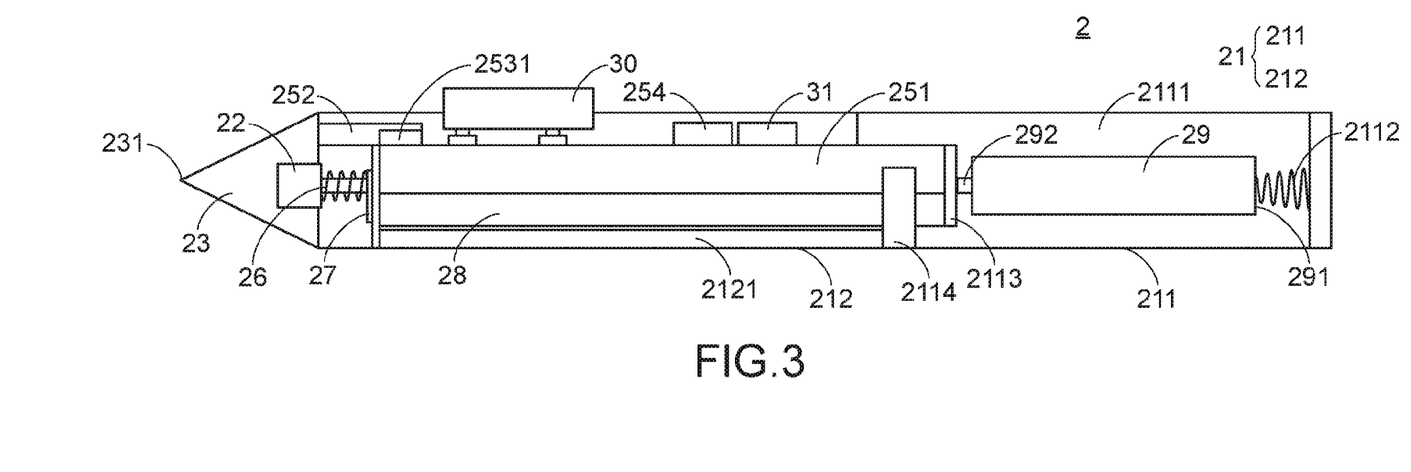
FIG. 3 is a schematic cross-sectional view illustrating a touch pen according to the first embodiment of the present invention, in which the touch pen is in an active operation mode.

Hereinafter, the structure of a touch pen will be illustrated with reference to FIGS. 2 and 3. FIG. 2 is a schematic cross-sectional view illustrating a touch pen according to a first embodiment of the present invention, in which the touch pen is in a passive operation mode. FIG. 3 is a schematic cross-sectional view illustrating a touch pen according to the first embodiment of the present invention, in which the touch pen is in an active operation mode. The user may use the touch pen 2 to operate a touch control device such as a touchpad, a tablet computer or a smart phone. In this embodiment, the touch pen 2 comprises a main body 21, a connector 22, a first conductive pen tip 23, a second conductive pen tip 24, a switching module 25, an elastic element 26, a pressure sensor 27, a bracket 28, a battery 29, an actuating button 30 and a wireless transmitter 31.

The main body 21 comprises a metallic pen tube 211 and a plastic pen tube 212. The plastic pen tube 212 is located at a first end of the main body 21 and connected with the metallic pen tube 211. The metallic pen tube 211 is located at a second end of the main body 21. The metallic pen tube 211 comprises an accommodation space 2111, a first negative elastic plate 2112, a positive elastic plate 2113 and a second negative elastic plate 2114. The battery 29 is accommodated within the accommodation space 2111. The first negative elastic plate 2112 is located at the second end of the main body 21, and contacted with a negative electrode 291 of the battery 29. The positive elastic plate 2113 is disposed within the accommodation space 2111, and contacted with a positive electrode 292 of the battery 29. A conductive loop is defined by the first negative elastic plate 2112, the positive elastic plate 2113 and the battery 29 collaboratively. Consequently, the electric power from the battery 29 can be transferred through the electric path. The function of the second negative elastic plate 2114 will be described later. Moreover, all of the metallic pen tube 211, the first negative elastic plate 2112, the positive elastic plate 2113 and the second negative elastic plate 2114 are made of a metallic material.

Please refer to FIG. 2 again. The connector 22 is disposed within the main body 21 and located at the first end of the main body 21. The connector 22 is used for fixing the first conductive pen tip 23 or the second conductive pen tip 24. The first conductive pen tip 23 is detachably coupled with the connector 22. When the touch pen 2 is in an active operation mode, the first conductive pen tip 23 can be used to touch a touch device. The second conductive pen tip 24 is detachably coupled with the connector 22. When the touch pen 2 is in a passive operation mode, the second conductive pen tip 24 can be used to touch the touch device. In this embodiment, the first conductive pen tip 23 is longer than the second conductive pen tip 24. Moreover, the area of a contact terminal 231 of the first conductive pen tip 23 is smaller than the area of a contact terminal 241 of the second conductive pen tip 24. As shown in FIGS. 2 and 3, the contact terminal 231 of the first conductive pen tip 23 has a pointed shape, and the contact terminal 241 of the second conductive pen tip 24 has a round shape. When the first conductive pen tip 23 is coupled with the connector 22, the touch pen 2 is in the active operation mode. When the second conductive pen tip 24 is coupled with the connector 22, the touch pen 2 is in the passive operation mode. In this embodiment, the first conductive pen tip 23 is made of a metallic material, and the second conductive pen tip 24 is made of a conductive non-woven material or a conductive rubber material. When the touch pen 2 is in the active operation mode, the touch pen 2 may be considered as an active touch pen. Whereas, when the touch pen 2 is in the passive operation mode, the touch pen 2 may be considered as a passive touch pen.

Figure 4:
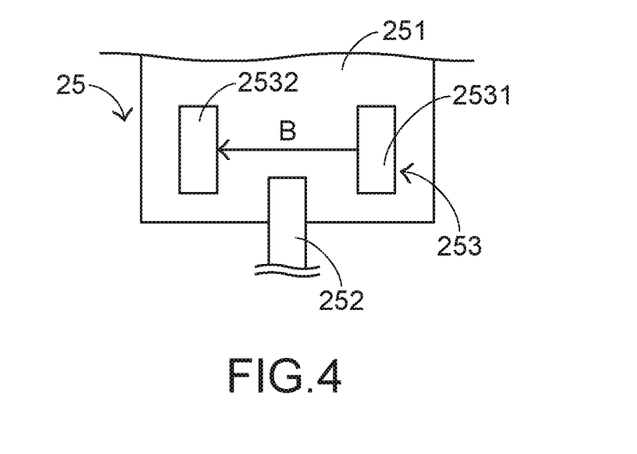
FIG. 4 is a schematic top view illustrating a detecting assembly of the switching module of the touch pen in the passive operation mode according to the first embodiment of the present invention.

The structure of the switching module 25 for switching the operation mode of the touch pen 2 will be illustrated in more details as follows. FIG. 4 is a schematic top view illustrating a detecting assembly of the switching module of the touch pen in the passive operation mode according to the first embodiment of the present invention. Please refer to FIGS. 2 and 4. The switching module 25 is disposed within the main body 21 and contacted with the first conductive pen tip 23 or the second conductive pen tip 24. The switching module 25 can detect whether the first conductive pen tip 23 or the second conductive pen tip 24 is coupled with the connector 22. If the switching module 25 detects that the first conductive pen tip 23 is coupled with the connector 22, the touch pen 2 is in the active operation mode under control of the switching module 25. If the switching module 25 detects that the second conductive pen tip 24 is coupled with the connector 22, the touch pen 2 is in the passive operation mode under control of the switching module 25. In this embodiment, the switching module 25 comprises a circuit board 251, a push element 252, a detecting assembly 253 and a controlling unit 254. The circuit board 251 is disposed on the bracket 28. The push element 252 is disposed within the main body 21. Moreover, the push element 252 is contacted with the first conductive pen tip 23 or the second conductive pen tip 24. When the push element 252 is pushed by the first conductive pen tip 23 or the second conductive pen tip 24, the push element 252 is moved relative to the main body 21.

The detecting assembly 253 is disposed on the circuit board 251. The detecting assembly 253 can judge the operation mode of the touch pen 2 by detecting the push element 252. When the push element 252 is detected by the detecting assembly 253, the detecting assembly 253 issues an active mode signal. The controlling unit 254 is disposed on the circuit board 251 and connected with the detecting assembly 253. When the active mode signal is received by the controlling unit 254, the touch pen 2 is in the active operation mode under control of the controlling unit 254. When the active mode signal is not received by the controlling unit 254, the touch pen 2 is in the passive operation mode under control of the controlling unit 254. The actuating button 30 is disposed on the circuit board 251 and partially exposed outside the plastic pen tube 212. The user may press the actuating button 30 to enable the switching module 25 and the pressure sensor 27. In this embodiment, the detecting assembly 253 comprises a light-emitting element 2531 and a light receiver 2532, and the controlling unit 254 is a microprocessor.

The structure of the detecting assembly 253 will be described as follows. The light-emitting element 2531 is disposed on the circuit board 251. Moreover, the light-emitting element 2531 is on a first side of the push element 252, and emits a light beam B. The light receiver 2532 is disposed on the circuit board 251. Moreover, the light receiver 2532 is on a second side of the push element 252, and connected with the controlling unit 254. The action of the light receiver 2532 is determined according to the result of judging whether the light beam B is received. For example, if the light beam B is not received by the light receiver 2532, the active mode signal is outputted from the light receiver 2532 to the controlling unit 254. If the light beam B is received by the light receiver 2532, the active mode signal is not outputted from the light receiver 2532.

Please refer to FIG. 2 again. The elastic element 26 is disposed on the connector 22 and provides an elastic force to the connector 22. In response to the elastic force, the connector 22 is moved relative to the main body 21. Moreover, the pressure sensor 27 is connected with the connector 22 and the controlling unit 254. When a pressing force received by the connector 22 is detected by the pressure sensor 27, a pressure touch signal is outputted from the pressure sensor 27 to the controlling unit 254. When the pressure touch signal is received by the controlling unit 254, the pressure touch signal is outputted from the controlling unit 254 to the touch device in order to control the touch device. The wireless transmitter 31 is also disposed on the circuit board 251. Moreover, the wireless transmitter 31 is in wireless communication with the touch device. Consequently, the pressure touch signal is transmitted from the wireless transmitter 31 to the touch device in a wireless transmission manner. In this embodiment, the elastic element 26 is a spiral spring, and the pressure sensor 27 is a force-sensitive resistor (FSR) sensor.

The operations of the touch pen 2 in the passive operation mode will be illustrated with reference to FIGS. 2 and 4. When the actuating button 30 of the touch pen 2 is pressed, the switching module 25 and the pressure sensor 27 of the touch pen 2 are enabled. Since the second conductive pen tip 24 is relatively shorter, the second conductive pen tip 24 coupled with the connector 22 will not push the push element 252 to the region between the light-emitting element 2531 and the light receiver 2532 (see FIG. 4). Under this circumstance, the light beam B from the light-emitting element 2531 is continuously received by the light receiver 2532. Under control of the switching module 25, the operation mode of the touch pen 2 is in the passive operation mode. Then, the user may grasp the touch pen 2 and allow the contact terminal 241 of the second conductive pen tip 24 to be contacted with the touch device in order to operate the touch device. While the contact terminal 241 of the second conductive pen tip 24 is contacted with the touch device, a pressing force received by the second conductive pen tip 24 is transmitted to the connector 22. When the pressing force received by the connector 22 is detected by the pressure sensor 27, a pressure touch signal corresponding to the pressing force is generated by the pressure sensor 27. Moreover, the pressure touch signal is transmitted to the touch device through the wireless transmitter 31.

When the touch pen 2 is grasped by the user, the user's finger is contacted with the plastic pen tube 212. Although the plastic pen tube 212 of main body 21 of the touch pen 2 is non-conductive, the electric charges of the user can be still transmitted to the second conductive pen tip 24 through the plastic pen tube 212. The reasons will be described as follows. For example, the plastic pen tube 212 comprises a conductive plate 2121. The conductive plate 2121 is disposed within the plastic pen tube 212, and contacted with the second negative elastic plate 2114. Moreover, the second negative elastic plate 2114 is contacted with the metallic pen tube 211. Consequently, a conductive loop is defined by the second negative elastic plate 2114 and the metallic pen tube 211 collaboratively. Under this circumstance, the electric charges of the user can be transmitted to the second conductive pen tip 24 through the conductive plate 2121, the second negative elastic plate 2114, the metallic pen tube 211 and the connector 22. Consequently, the touch pen 2 is operated in the passive operation mode.

Figure 5:
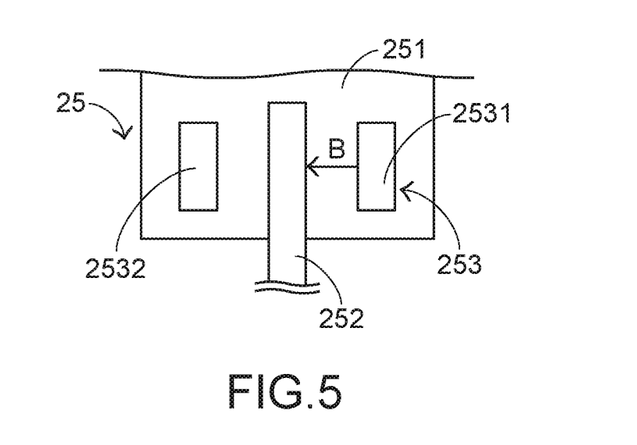
FIG. 5 is a schematic top view illustrating the detecting assembly of the switching module of the touch pen in the active operation mode according to the first embodiment of the present invention.

The operations of the touch pen 2 in the active operation mode will be illustrated with reference to FIGS. 3 and 5. FIG. 5 is a schematic top view illustrating the detecting assembly of the switching module of the touch pen in the active operation mode according to the first embodiment of the present invention. After the second conductive pen tip 24 is detached from the connector 22, the first conductive pen tip 23 is coupled with the connector 22. Since the first conductive pen tip 23 is longer than the second conductive pen tip 24, the first conductive pen tip 23 coupled with the connector 22 pushes the push element 252 to the region between the light-emitting element 2531 and the light receiver 2532 (see FIG. 5). Under this circumstance, since the light beam B from the light-emitting element 2531 is obstructed by the push element, the light beam B is no longer received by the light receiver 2532. Consequently, an active mode signal is outputted from the light receiver 2532 to the controlling unit 254. Under control of the switching module 25, the operation mode of the touch pen 2 is switched from the passive operation mode to the active operation mode.

After the operation mode of the touch pen 2 is switched to the active operation mode, the user may grasp the touch pen 2 and allow the contact terminal 231 of the first conductive pen tip 23 to be contacted with the touch device. While the contact terminal 231 of the first conductive pen tip 23 is contacted with the touch device, a pressing force received by the first conductive pen tip 23 is transmitted to the connector 22. When the pressing force received by the connector 22 is detected by the pressure sensor 27, a pressure touch signal corresponding to the pressing force is outputted from the pressure sensor 27 to the controlling unit 254. When the pressure touch signal is received by the controlling unit 254, the pressure touch signal is transmitted to the touch device through a built-in wireless transmission unit (not shown) of the controlling unit 254 in order to control the touch device. As mentioned above, the touch pen 2 transmits the pressure touch signal through the internal electronic component when the touch pen 2 is in the active operation mode. For preventing from the double touching problem, an inner surface of the first conductive pen tip 23 is coated with a non-conductive layer (not shown). When the first conductive pen tip 23 is coupled with the connector 22, the electric charges of the user are not transmitted to the first conductive pen tip 23 through the metallic pen tube 211 and the connector 22. Consequently, the double touching problem is avoided.

Figure 6:
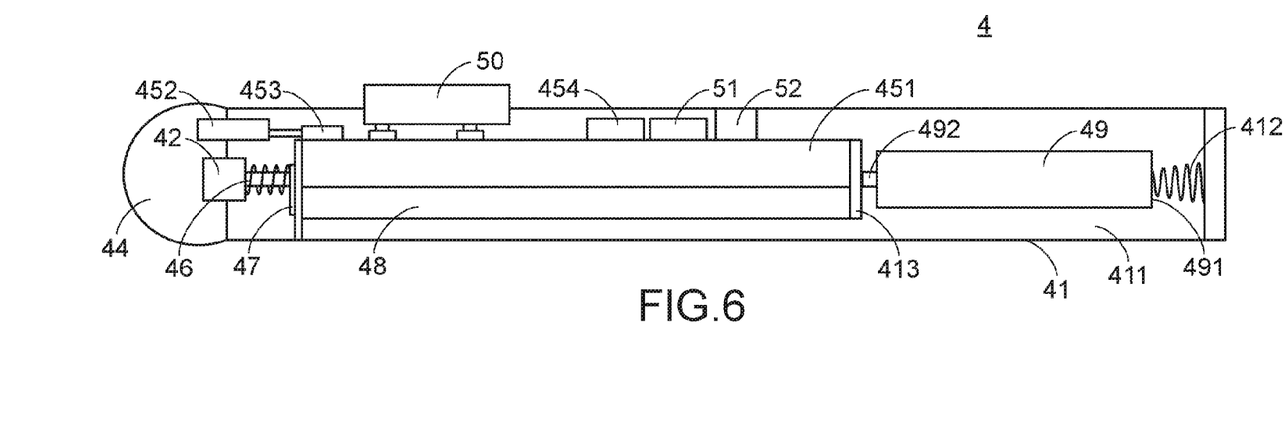
FIG. 6 is a schematic cross-sectional view illustrating a touch pen according to a second embodiment of the present invention, in which the touch pen is in a passive operation mode.
Figure 7:
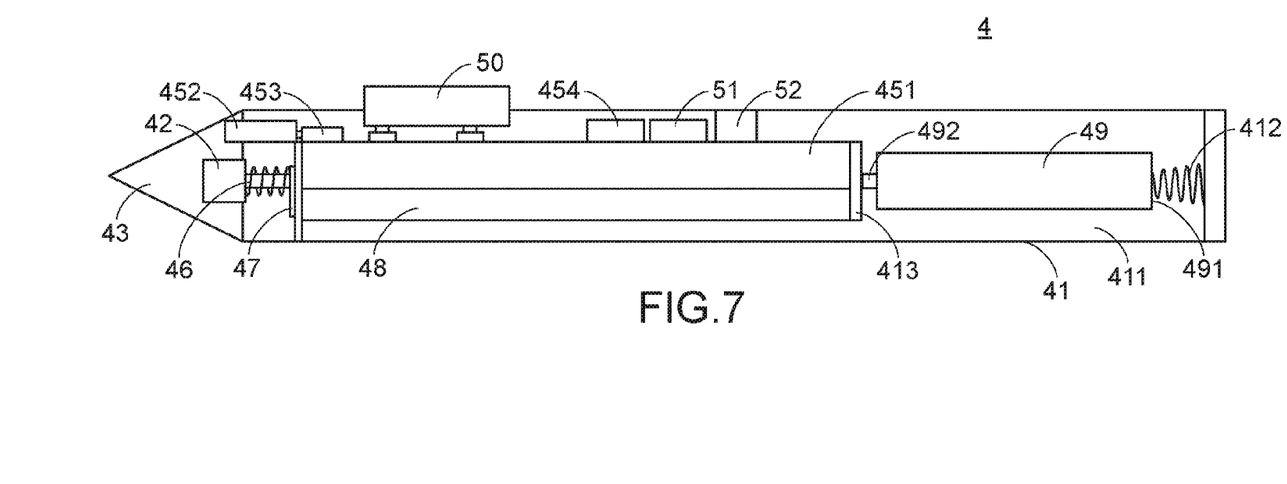
FIG. 7 is a schematic cross-sectional view illustrating a touch pen according to the second embodiment of the present invention, in which the touch pen is in an active operation mode.

The present invention further provides a touch pen of a second embodiment. Hereinafter, the structure of a touch pen of the second embodiment will be illustrated with reference to FIGS. 6 and 7. FIG. 6 is a schematic cross-sectional view illustrating a touch pen according to a second embodiment of the present invention, in which the touch pen is in a passive operation mode. FIG. 7 is a schematic cross-sectional view illustrating a touch pen according to the second embodiment of the present invention, in which the touch pen is in an active operation mode. In this embodiment, the touch pen 4 comprises a main body 41, a connector 42, a first conductive pen tip 43, a second conductive pen tip 44, a switching module 45, an elastic element 46, a pressure sensor 47, a bracket 48, a battery 49, an actuating button 50, a wireless transmitter 51 and a mode display element 52. In this embodiment, the switching module 45 comprises a circuit board 451, a push element 452, a detecting assembly 453 and a controlling unit 454. Except for the following three aspects, the structures of the components of the touch pen 4 of this embodiment are substantially identical to those of the first embodiment, and are not redundantly described herein. Firstly, the structure of the main body 41 is distinguished. Secondly, the structure of the detecting assembly 453 is distinguished. Thirdly, the touch pen 4 further comprises the mode display element 52.

The structure of the main body 41 will be described as follows. The main body 41 comprises an accommodation space 411, a negative elastic plate 412 and a positive elastic plate 413. The battery 49 is accommodated within the accommodation space 411. The negative elastic plate 412 is located at the second end of the main body 41, and contacted with a negative electrode 491 of the battery 49. The positive elastic plate 413 is disposed within the accommodation space 411, and contacted with a positive electrode 492 of the battery 49. Moreover, all of the metallic pen tube 411, the negative elastic plate 412 and the positive elastic plate 413 are made of a metallic material. In this embodiment, the main body 41 is a metallic pen tube. Since the electric charges of the user can be transmitted to the second conductive pen tip 44 through the main body 41, the conductive plate and the second negative elastic plate as described in the first embodiment can be omitted.

In comparison with the detecting assembly of the first embodiment, the detecting assembly 453 of this embodiment is a pogo pin. In particular, the detecting assembly 453 is enabled in response to the pushing action of the push element 452. When the second conductive pen tip 44 is coupled with the connector 42, the detecting assembly 453 is not pushed by the push element 452 or only slightly pushed by the push element 452. Consequently, the detecting assembly 453 does not issue the active mode signal. That is, as shown in FIG. 6, the touch pen 4 is in the passive operation mode.

When the first conductive pen tip 43 is coupled with the connector 42, the detecting assembly 453 is pushed by the push element 452 because the first conductive pen tip 43 is longer than the second conductive pen tip 44. Consequently, the detecting assembly 453 issues the active mode signal to the controlling unit 454. Under control of the controlling unit 454, the operation mode of the touch pen 4 is switched from the passive operation mode to the active operation mode (see FIG. 7).

Moreover, the mode display element 52 is disposed on the circuit board 451 and partially exposed outside the main body 41. According to the operation result of the switching module 45, the mode display element 52 generates a corresponding light signal. For example, if the touch pen 4 is in the passive operation mode under control of the switching module 45, the mode display element 52 generates a first signal. For example, the first signal indicates that no light is emitted or a blue light is emitted. Whereas, if the touch pen 4 is in the active operation mode under control of the switching module 45, the mode display element 52 generates a second signal. For example, the second signal indicates that a specified light is emitted or a red light is emitted. In an embodiment, the mode display element 52 is a light emitting diode.

From the above descriptions, the present invention provides the touch pen. The touch pen can be selectively in the active operation mode or the passive operation mode. Moreover, by changing the conductive pen tip, the operation mode of the touch pen can be switched. Consequently, the touch pen is operated in a desired operation mode according to the practical requirements. In case that the longer conductive pen tip (e.g., the first conductive pen tip) is coupled with the connector, the push element is pushed by the first conductive pen tip and thus the push element is detected by the detecting module. Consequently, the touch pen is in the active operation mode under control of the controlling unit. In case that the shorter conductive pen tip (e.g., the second conductive pen tip) is coupled with the connector, the push element is not pushed by the first conductive pen tip and thus the push element is not detected by the detecting module. Consequently, the touch pen is in the passive operation mode under control of the controlling unit. As previously described, the user has to carry two kinds of touch pens according to the conventional technology. The use of the touch pen of the present invention can overcome the drawbacks of the conventional technology.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch pen for a touch device, the touch pen comprising:
   a main body;
   a connector disposed within the main body, and located at a first end of the main body;
   a first conductive pen tip detachably coupled with the connector, and contactable with the touch device;
   a second conductive pen tip detachably coupled with the connector, and contactable with the touch device; and
   a switching module disposed within the main body, and contacted with the first conductive pen tip or the second conductive pen tip, wherein the switching module detects whether the first conductive pen tip or the second conductive pen tip is coupled with the connector, wherein when the first conductive pen tip is coupled with the connector, the touch pen is in an active operation mode under control of the switching module, wherein when the second conductive pen tip is coupled with the connector, the touch pen is in a passive operation mode under control of the switching module, wherein the switching module comprises:
   a circuit board;
   a push element disposed within the main body, and contacted with the first conductive pen tip or the second conductive pen tip, wherein when the push element is pushed by the first conductive pen tip or the second conductive pen tip, the push element is moved relative to the main body;
   a detecting assembly disposed on the circuit board, and detecting the push element, wherein when the push element is detected by the detecting assembly, the detecting assembly issues an active mode signal; and
   a controlling unit disposed on the circuit board, and connected with the detecting assembly, wherein when the active mode signal is received by the controlling unit, the touch pen is in the active operation mode under control of the controlling unit, wherein when the active mode signal is not received by the controlling unit, the touch pen is in the passive operation mode under control of the controlling unit,
   a light-emitting element disposed on the circuit board, wherein the light-emitting element is on a first side of the push element, and emits a light beam; and
   a light receiver disposed on the circuit board, wherein the light receiver is on a second side of the push element, and connected with the controlling unit to receive the light beam, wherein if the light beam is not received by the light receiver, the active mode signal is outputted from the light receiver to the controlling unit.

2. The touch pen according to claim 1, wherein when the detecting assembly is pushed by the pushing element, the detecting assembly issues the active mode signal to the controlling unit, wherein the detecting assembly is a pogo pin.

3. The touch pen according to claim 1, further comprising:
   an elastic element disposed on the connector, and providing an elastic force to the connector, wherein the connector is moved relative to the main body in response to the elastic force; and
   a pressure sensor connected with the connector and the controlling unit, wherein when a pressing force received by the connector is detected by the pressure sensor, a pressure touch signal is outputted from the pressure sensor to the controlling unit, wherein when the pressure touch signal is received by the controlling unit, the pressure touch signal is outputted from the controlling unit to the touch device.

4. The touch pen according to claim 1, wherein the first conductive pen tip is longer than the second conductive pen tip, and an area of a contact terminal of the first conductive pen tip is smaller than an area of a contact terminal of the second conductive pen tip.

5. The touch pen according to claim 1, wherein the main body comprises:
   a metallic pen tube located at a second end of the main body, and comprising an accommodation space, a first negative elastic plate, a positive elastic plate and a second negative elastic plate, wherein a battery is accommodated within the accommodation space, the first negative elastic plate is located at the second end of the main body and contacted with a negative electrode of the battery, a positive elastic plate is disposed within the accommodation space and contacted with a positive electrode of the battery, and the second negative elastic plate is contacted with the metallic pen tube; and
   a plastic pen tube located at the first end of the main body, and connected with the metallic pen tube, wherein the plastic pen tube comprises a conductive plate, and the conductive plate is contacted with the second negative elastic plate, wherein a conductive loop is defined by the conductive plate, the second negative elastic plate and the metallic pen tube collaboratively, so that electric charges of a user are transmitted to the second conductive pen tip through the second negative elastic plate.

6. The touch pen according to claim 1, wherein the main body comprises:
   an accommodation space, wherein a battery is accommodated within the accommodation space;
   a negative elastic plate located at a second end of the main body, and contacted with a negative electrode of the battery; and a positive elastic plate disposed within the accommodation space, and contacted with a positive electrode of the battery.

7. The touch pen according to claim 6, wherein the main body is a metallic pen tube.

8. The touch pen according to claim 1, wherein the first conductive pen tip is made of a metallic material.

9. The touch pen according to claim 1, wherein the second conductive pen tip is made of a conductive non-woven material or a conductive rubber material.

10. A touch pen for a touch device, the touch pen comprising:
   a main body;
   a connector disposed within the main body, and located at a first end of the main body;
   a first conductive pen tip detachably coupled with the connector, and contactable with the touch device;
   a second conductive pen tip detachably coupled with the connector, and contactable with the touch device; and
   a switching module disposed within the main body, and contacted with the first conductive pen tip or the second conductive pen tip, wherein the switching module detects whether the first conductive pen tip or the second conductive pen tip is coupled with the connector, wherein when the first conductive pen tip is coupled with the connector, the touch pen is in an active operation mode under control of the switching module, wherein when the second conductive pen tip is coupled with the connector, the touch pen is in a passive operation mode under control of the switching module, wherein the main body comprises:
   a metallic pen tube located at a second end of the main body, and comprising an accommodation space, a first negative elastic plate, a positive elastic plate and a second negative elastic plate, wherein a battery is accommodated within the accommodation space, the first negative elastic plate is located at the second end of the main body and contacted with a negative electrode of the battery, a positive elastic plate is disposed within the accommodation space and contacted with a positive electrode of the battery, and the second negative elastic plate is contacted with the metallic pen tube; and
   a plastic pen tube located at the first end of the main body, and connected with the metallic pen tube, wherein the plastic pen tube comprises a conductive plate, and the conductive plate is contacted with the second negative elastic plate, wherein a conductive loop is defined by the conductive plate, the second negative elastic plate and the metallic pen tube collaboratively, so that electric charges of a user are transmitted to the second conductive pen tip through the second negative elastic plate.

* * * * *